United States Patent
Kassab

(10) Patent No.: US 11,572,793 B2
(45) Date of Patent: Feb. 7, 2023

(54) GAS TURBINE ENGINE EXHAUST CASE

(71) Applicant: PRATT & WHITNEY CANADA CORP., Longueuil (CA)

(72) Inventor: Rabih Kassab, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 250 days.

(21) Appl. No.: 16/524,406

(22) Filed: Jul. 29, 2019

(65) Prior Publication Data

US 2021/0032996 A1    Feb. 4, 2021

(51) Int. Cl.
*F01D 5/22*    (2006.01)
*F01D 9/04*    (2006.01)

(52) U.S. Cl.
CPC ............. *F01D 5/225* (2013.01); *F01D 9/042* (2013.01)

(58) Field of Classification Search
CPC ... F01D 5/225; F01D 9/00; F01D 9/04; F01D 9/042; F01D 9/044; F01D 25/00; F01D 25/24; F01D 25/30; F05D 2230/232; F05D 2240/10; F05D 2240/12; F05D 2240/125; F05D 2300/5021; F02K 1/04
See application file for complete search history.

(56) References Cited

U.S. PATENT DOCUMENTS

| | | | |
|---|---|---|---|
| 2,648,353 A * | 8/1953 | Haworth | F02K 1/04 138/37 |
| 2,813,396 A * | 11/1957 | Kress | F02K 1/04 60/796 |
| 3,104,525 A * | 9/1963 | Shields | F01D 25/162 60/799 |
| 8,826,669 B2 | 9/2014 | Bouchard et al. | |
| 8,944,753 B2 | 2/2015 | Bouchard et al. | |
| 9,890,663 B2 | 2/2018 | Scott | |
| 10,054,009 B2 | 8/2018 | Scott | |
| 10,288,289 B2 | 5/2019 | Eastwood et al. | |
| 2011/0036068 A1 | 2/2011 | Lefebvre et al. | |
| 2013/0111906 A1 | 5/2013 | Bouchard et al. | |
| 2013/0115051 A1 | 5/2013 | Bouchard et al. | |
| 2014/0332604 A1 | 11/2014 | Andlauer et al. | |
| 2017/0089296 A1 * | 3/2017 | Bisson | F02K 1/48 |
| 2019/0093481 A1 | 3/2019 | Spadacini et al. | |

FOREIGN PATENT DOCUMENTS

| | | |
|---|---|---|
| EP | 2189662 | 5/2010 |
| EP | 2735707 | 5/2014 |
| EP | 2770190 | 8/2014 |

(Continued)

*Primary Examiner* — Courtney D Heinle
*Assistant Examiner* — Danielle M. Christensen
(74) *Attorney, Agent, or Firm* — Norton Rose Fulbright Canada LLP

(57) ABSTRACT

The turbine exhaust case can have an outer shroud, an inner shroud internal to the outer shroud, an annular exhaust path between the outer shroud and the inner shroud, and a plurality of struts each having a length extending across the annular exhaust path from a radially inner end to a radially outer end, the struts circumferentially interspaced from one another, the struts each having a leading edge and a trailing edge, a stiff connection between the radially inner end and the inner shroud, and a point connection between the radially outer end and the outer shroud.

20 Claims, 5 Drawing Sheets

(56) References Cited

FOREIGN PATENT DOCUMENTS

| | | | | |
|---|---|---|---|---|
| EP | 3441573 | 2/2019 | | |
| GB | 266375 | 6/1927 | | |
| GB | 777742 | 6/1957 | | |
| GB | 866555 A | * 4/1961 | ............... | F02K 1/04 |
| GB | 1069507 | 5/1967 | | |
| WO | 2009157817 | 12/2009 | | |

* cited by examiner

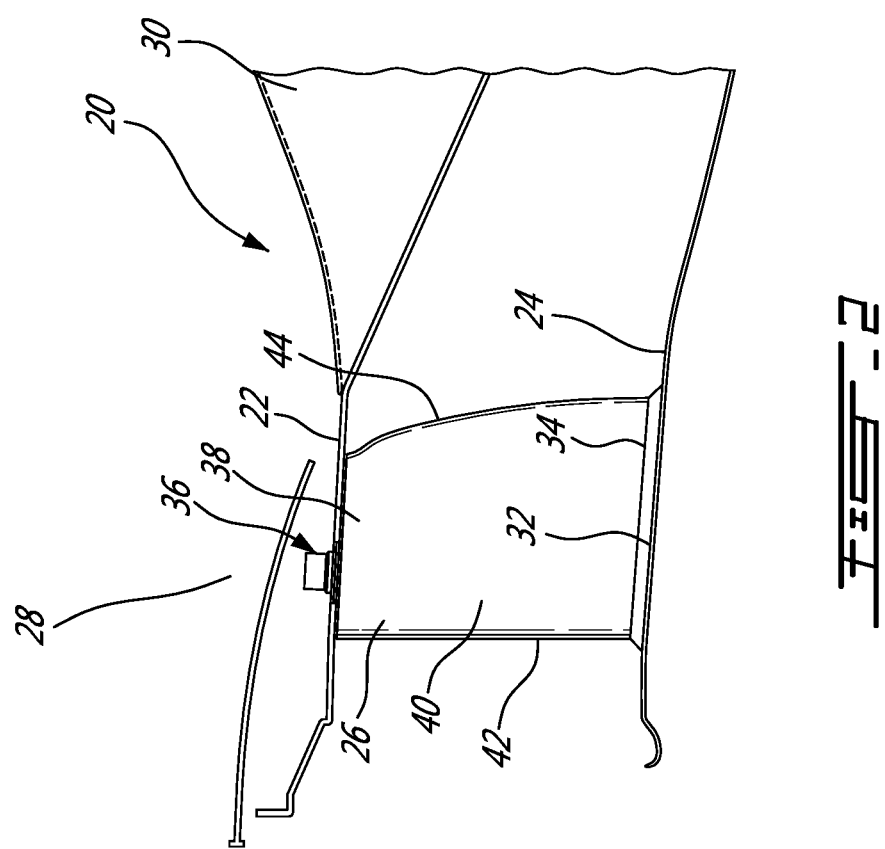

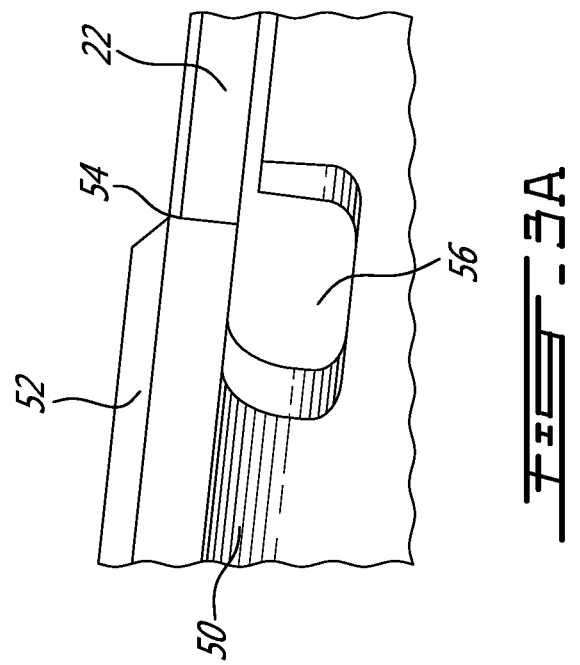
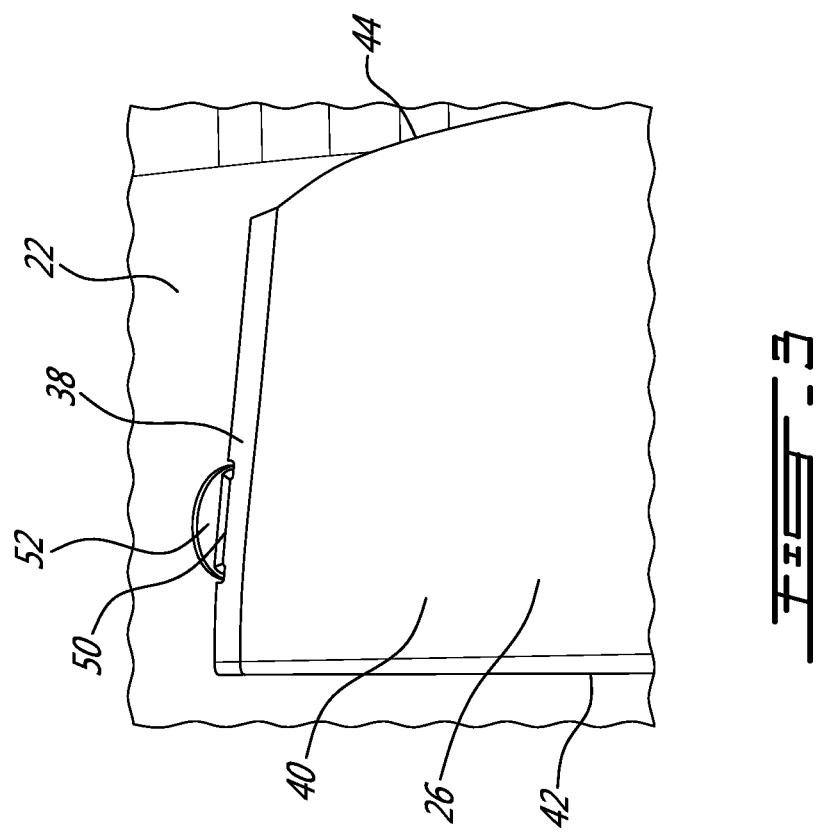

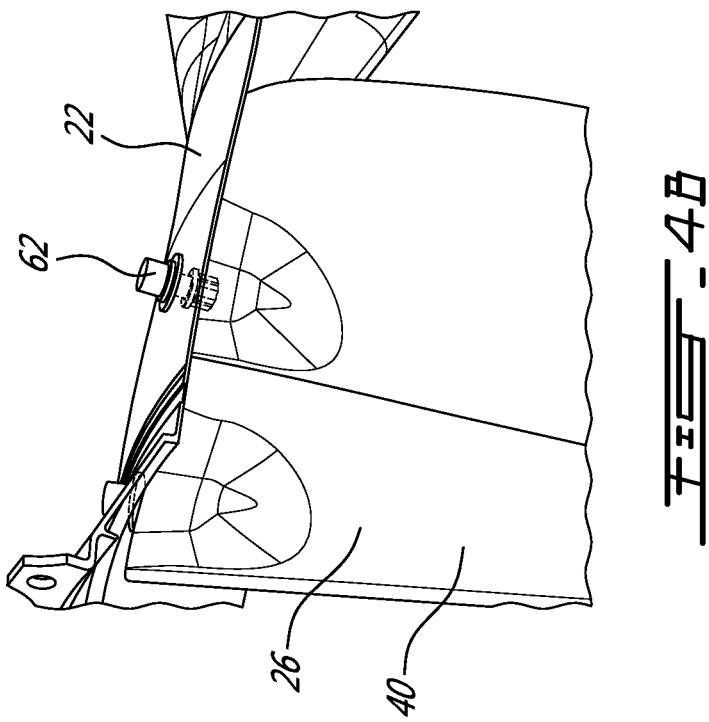
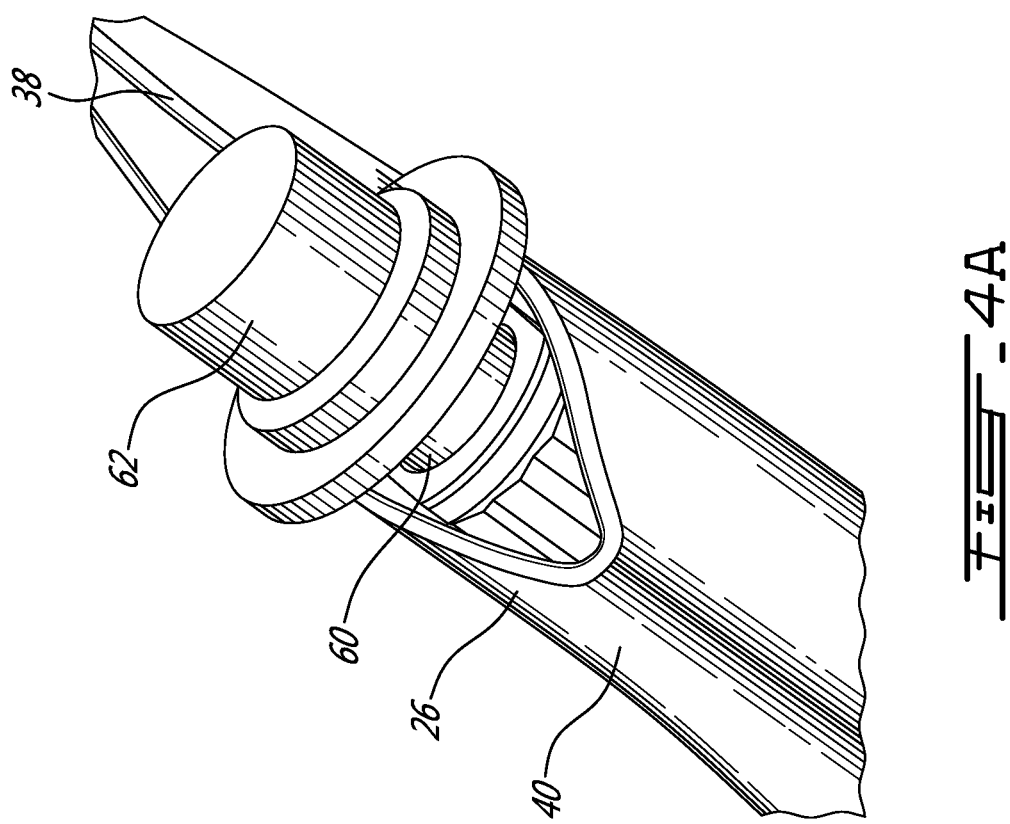

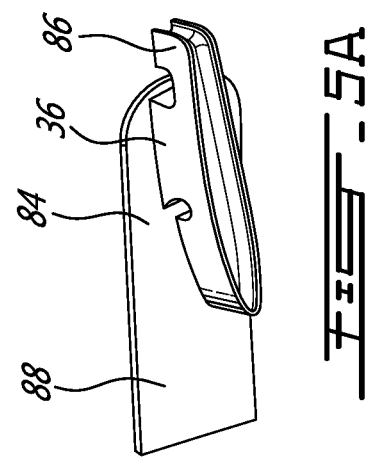
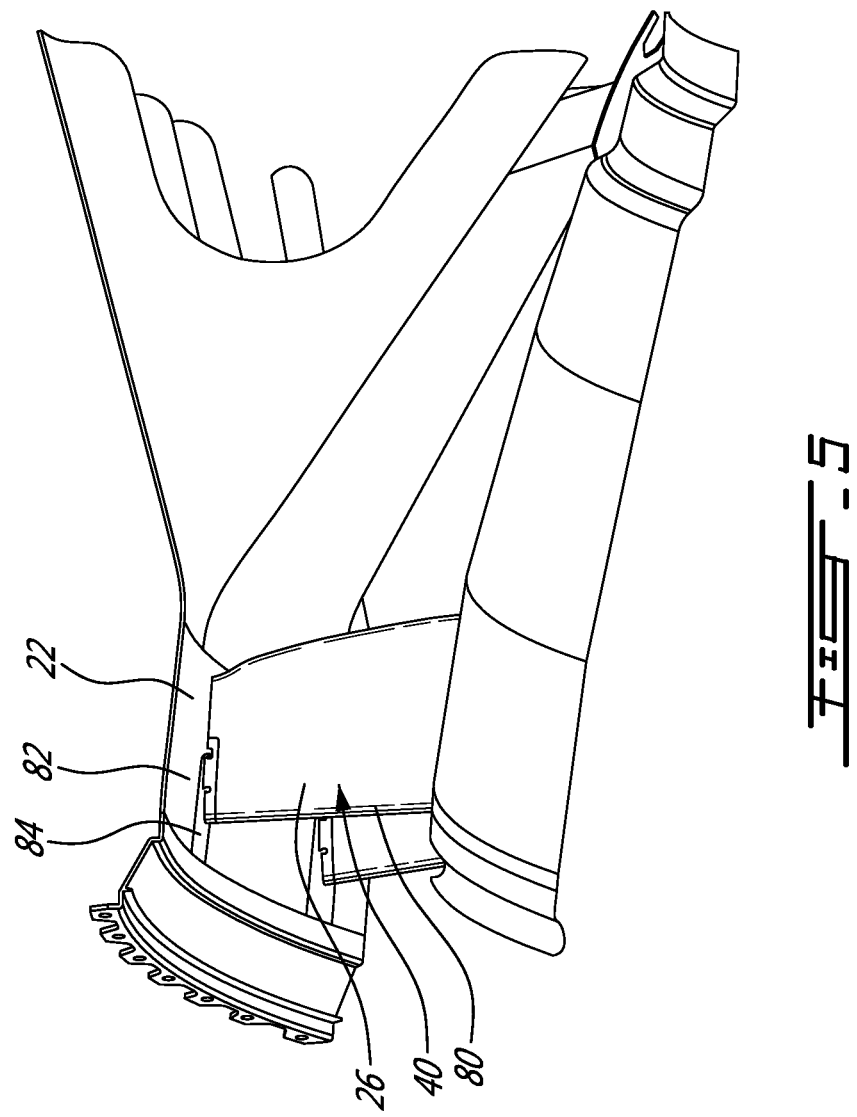

GAS TURBINE ENGINE EXHAUST CASE

TECHNICAL FIELD

The application related generally to turbine exhaust cases and, more particularly, to strut configurations thereof.

BACKGROUND OF THE ART

Various factors exert pressures on gas turbine engine manufacturers to continually improve their designs. Design improvements in gas turbine engines take many factors into consideration, such as weight, structural optimization, durability, production costs, etc. Accordingly, while known turbine exhaust cases were satisfactory to a certain extent, there remained room for improvement.

SUMMARY

In one aspect, there is provided a turbine exhaust case comprising an outer shroud, an inner shroud internal to the outer shroud, an annular exhaust path between the outer shroud and the inner shroud, and a plurality of struts each having a length extending across the annular exhaust path from a radially inner end to a radially outer end, the struts circumferentially interspaced from one another, the struts each having a leading edge and a trailing edge, a stiff connection between the radially inner end and the inner shroud, and a point connection between the radially outer end and the outer shroud.

In another aspect, there is provided a gas turbine engine comprising a main gas path extending in serial flow across a compressor, a combustor, a turbine, and an exhaust section, the exhaust section having an outer shroud forming an radially outer limit to the main gas path, an inner shroud forming a radially inner limit to the main gas path, and a plurality of struts each having a length extending across the main gas path from a radially inner end to a radially outer end, the struts circumferentially interspaced from one another, the struts each having a leading edge facing the turbine and an oppositely oriented trailing edge, a stiff connection between the radially inner end and the inner shroud, and a point connection between the radially outer end and the outer shroud.

In a further aspect, there is provided a method of operating a gas turbine engine having a plurality of struts extending radially across an exhaust gas path between an inner shroud and an outer shroud, circumferentially interspaced from one another, the method comprising subjecting the struts to thermal expansion while: a) the inner shroud rigidly holds an inner end of the struts; b) the outer shroud rigidly holds a point connection provided at the outer end of the struts; c) a portion of the outer end of the struts in excess of the point connection moving relative to the outer shroud due to said thermal expansion.

DESCRIPTION OF THE DRAWINGS

Reference is now made to the accompanying figures in which:

FIG. 2 is an enlarged portion of FIG. 1, showing the turbine exhaust case;

FIGS. 3 and 3A are views showing a point connection between a strut and the outer shroud, in accordance with one embodiment;

FIGS. 4A and 4B are views showing a point connection between a strut and the outer shroud, in accordance with another embodiment;

FIG. 5 is a view showing a turbine exhaust case in accordance with another embodiment, with FIG. 5A showing an insert thereof.

DETAILED DESCRIPTION

Figure 1:
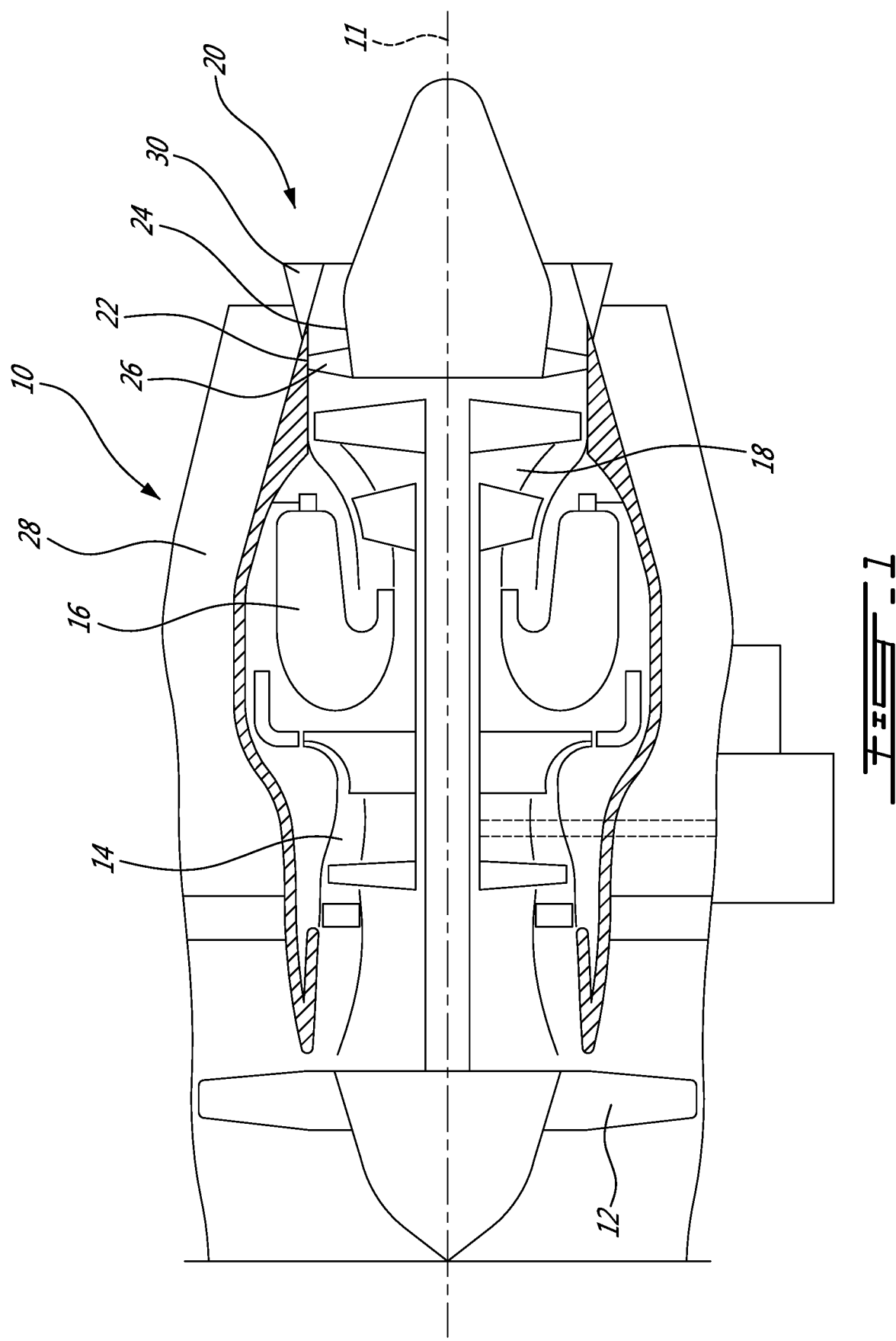
FIG. 1 is a schematic cross-sectional view of a gas turbine engine.

FIG. 1 illustrated a gas turbine engine 10 of a type preferably provided for use in subsonic flight, generally comprising in serial flow communication along a core gas path a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A turbine exhaust case 20 can terminate the core, or main, gas path. The turbine exhaust case 20 can include an outer shroud 22 forming a radially outer delimitation of a annular exhaust path of the core gas path, an inner shroud 24 forming a radially inner delimitation of the annular exhaust path of the core gas path, and a plurality of struts 26 extending generally radially across the annular exhaust path, circumferentially interspaced from one another. The gas turbine engine 10 extending along a central axis 11.

In the example presented in FIG. 1, the gas turbine engine 10 is a turbofan engine and further has a bypass path 28 formed between an outer bypass duct and the core engine, downstream of the fan 12. In this embodiment, a mixer 30 can be provided as part of the turbine exhaust case 20 to mix the hot engine exhaust flow and the relatively cold bypass flow 28 to obtain a performance gain for the engine. In such a context, the function of the TEC struts 26 can be twofold: (1) aerodynamically prepare the core airflow for mixing and (2) provide structure to the TEC.

The TEC struts 26 can be subjected to high thermal gradients. In particular, the area forming the interface between the hot exhaust flow and the cold bypass flow may generate significant thermal gradients. These gradients can affect stress on the TEC strut 26 and nearby connections.

In addition to high thermal loading, the aerodynamic forces acting on or transmitted by the TEC strut 26 can result in significant mechanical loading. These mechanically induced stresses can add to the thermal induced stresses on the TEC-strut material and nearby connections.

Accordingly, a challenge resided in designing a structure capable of accommodating both the thermal and mechanical loads to which the TEC strut 26 and connected materials are subjected.

FIG. 2 provides an example of a TEC 20 configuration which can address this challenge. The TEC 20 includes an outer shroud 22, an inner shroud 24, and a plurality of struts 26 each having a length oriented across the annular exhaust path. A stiff connection 32 is provided between a radially inner end 34 of the struts 26 and the inner shroud 24, whereas a point connection 36 is provided between the radially outer end 38 of the struts 26 and the outer shroud 22. The stiff connection 32 is "stiff" in the sense that the entire periphery or cross-sectional area of the radially inner end 34 of the struts 26, or almost the entire periphery or cross-sectional area, is connected to the inner shroud 24, such that the thermal expansion of the periphery or cross-sectional area is structurally linked to the thermal expansion of the shroud. Indeed, in this example, the entire cross-sectional area of the radially inner ends 34 of the struts 26 is structurally connected to the inner shroud 24. The point connection 36 is "flexible" in the sense that only a minor portion of the periphery or cross-sectional area of the outer end 38 of the struts 26 is structurally connected to the shroud 22 and structurally linked to the shroud 22 for thermal expansion. The remainder of the cross-sectional area of the outer end 38 of the struts 26, or otherwise said, the portion of the cross-sectional area of the outer end 38 of the struts 26 in excess of the point connection 36, is not structurally connected to the outer shroud 22, and are thus free to move relative to the shroud 22, to avoid or reduce the communication of stresses stemming from thermal expansion, for instance.

In the example of FIG. 2, the struts 26 have an airfoil body with a leading edge 42 and a trailing edge 44, the leading edge 42 facing the gas incoming from the turbine section, and the trailing edge 44 facing the mixer 30. In this context, the point/stiff connection configuration described above can allow structural flexibility at the location of the high thermal loads on one radial end of the strut 26 while creating a stiff connection on the opposite side of the strut 26 to absorb mechanical loads. Indeed, only a portion of the cross-sectional area (here, cross-sectional area refers to an area of a cross-section taken perpendicular to the length of the struts) of the radially outer end 38 of the strut 26 is secured to the outer shroud 22, a remainder of the cross-sectional area of the radially outer end 38, in excess of the point connection, being not secured to the outer shroud 22, rather merely lying beside it, and is free to move relative to the outer shroud 22. The point connection 36 has a cross-sectional area which has less than half the cross-sectional area of the strut at the radially outer end, leaving more than half the cross-sectional area unattached to the shroud. In most embodiments, the point connection will have significantly less than 40% of the cross-sectional area of the strut at the radially outer end, typically between 10-20%, and thus typically leaving 80-90% of the cross-sectional area of the strut 26 structurally unattached to the outer shroud 22.

The point connection 36 can be immediately adjacent the radially outer end 38 of the strut, project radially therefrom, and therefore be contained within a lengthwise projection of the periphery of the airfoil body of the strut.

The point connection 36 can take various forms, and can include a holding member. The holding member can take the form of a projection of the airfoil body, or the form of a bolt or threaded stem held at its base in the airfoil body, extending across the outer shroud, and secured by a nut on the other side, to name two examples which will now be detailed.

Referring to FIG. 3, in accordance with a first embodiment, the airfoil body 40 of the strut has a projection 50 protruding from a portion of the cross-sectional area of the radially outer end 38 of the airfoil body 40, at an intermediary location between the leading edge 42 and the trailing edge 44. The projection 50 has a circular member 52 configured to fit into a corresponding circular aperture in the shroud 22, where an outer edge 54 of the circular member can be welded to an inner edge of the circular aperture. Depressions 56 can be provided on each axial side of the projection 50, to allow room for the weld, and/or to create a transition between the projection 50, which is structurally attached to the outer shroud 22, and the portion of the outer end of the strut 26 which is unattached to the outer shroud 22. The trailing edge side depression 56 is shown more clearly in FIG. 3A.

Referring to FIG. 4, in accordance with a second embodiment, the airfoil body 40 of the strut 26 has a threaded stem 60 embedded therein, the threaded stem 60 projecting radially from the outer end 38 of the strut 26. The length of the threaded stem 60 can be selected in a manner for the threaded stem 60 to extend across the sheet or wall of the outer shroud 22, and to be secured to the outer shroud 22 by a nut 62 engaged with the threaded stem 60, on the opposite side of the outer shroud 22 from the airfoil body 40.

The struts 26 and/or the shrouds 22, 24 can be made of a single component, or made of a number of components assembled to one another. For instance, in an embodiment shown in FIG. 5, a first component 80 forms most of the airfoil body 40 of the struts 26, a second component 82 forms most of the outer shroud 22, and an insert 84 is provided, connecting the two to one another. The insert 84 is shown more clearly, alone, on FIG. 5A.

The insert 84 has a strut portion 86 shaped to fit a corresponding negative feature in the radially outer end of the strut 26, to which it can be welded. The insert 84 also has the point connection 36, provided, in this example, in the form of a projection. The insert 84 also has a shroud portion 88, shaped to fit a corresponding negative feature in the outer shroud 22, to which it can be welded. The insert 84 can be machined for instance. Accordingly, once the first component 80, insert 84, and second component 82 are welded to one another, the strut 26 has a point connection 36 to the outer shroud 22 in the form of the projection, via the shroud portion 88 of the insert 84. Indeed, in various embodiments, it can be advantageous to design the TEC with such inserts for any suitable reason.

Similarly, while the radially inner end of the struts 26 can be directly welded, around their entire periphery, to the inner shroud 24, in alternate embodiments, a third component, which can be referred to as an insert, can be used to form part of the connection between the radially inner end of the strut and the inner shroud. Indeed, such an insert can include a strut portion and an inner shroud portion for instance, and the insert can be integral, such as a machined component, in a manner that when the strut portion is welded or otherwise secured to the strut, and the inner shroud portion is welded or otherwise secured to the inner shroud, a stiff connection is formed between the strut and the inner shroud.

The above description is meant to be exemplary only, and one skilled in the art will recognize that changes may be made to the embodiments described without departing from the scope of the invention disclosed. For example, while the configuration cited in example above can have a particular advantage in a context of a turbofan gas turbine engine, it can also find advantageous uses in the context of other types of gas turbine engines, such as turboprop or turboshaft engines, to name two examples. Still other modifications which fall within the scope of the present invention will be apparent to those skilled in the art, in light of a review of this disclosure, and such modifications are intended to fall within the appended claims.

The invention claimed is:

1. A turbine exhaust case comprising:
   an outer shroud;
   an inner shroud internal to the outer shroud;
   an annular exhaust path defined between the outer shroud and the inner shroud; and
   a plurality of struts extending across the annular exhaust path from a radially inner end to a radially outer end, the struts circumferentially interspaced from one another, the struts having
      a stiff connection between the radially inner end and the inner shroud, and
      a point connection between the radially outer end and the outer shroud, the point connection having a projection projecting radially from the radially outer end, the projection being rigidly secured to the radially outer end, the projection being rigidly secured to the outer shroud.

2. The turbine exhaust case of claim 1 wherein the struts have an airfoil body having a cross-sectional area, the point connections having a cross-sectional area between 5 and 30% of the cross-sectional area of the airfoil body at the radially outer end of the struts, with a portion of the cross-sectional area of the airfoil body at the radially outer end of the struts in excess of the point connection being free from the outer shroud.

3. The turbine exhaust case of claim 2 wherein the point connections have a cross-sectional area between 10 and 20% of the cross-sectional area of the radially outer end of the struts.

4. The turbine exhaust case of claim 1 wherein the projection has a cross-sectional periphery welded to the outer shroud and forming the point connection.

5. The turbine exhaust case of claim 1 wherein the projection is a threaded stem projecting radially from a portion of a cross-sectional area thereof, the threaded stem extending radially across the outer shroud, secured via a nut, and forming the point connection.

6. The turbine exhaust case of claim 1 wherein the struts have an airfoil body having a cross-sectional area, and an entire periphery of the airfoil body at the radially inner end is secured to the inner shroud.

7. The turbine exhaust case of claim 6 wherein the entire periphery of the airfoil body at the radially inner end is welded to the inner shroud.

8. The turbine exhaust case of claim 1 wherein the strut includes a main body portion and an insert welded to the main body portion, the projection projects radially from the insert from a cross-sectional area of the strut and forming the point connection.

9. The turbine exhaust case of claim 1 wherein the strut includes a main body portion and an insert welded to the main body portion, an entire periphery of the insert being welded to the inner case and forming the stiff connection.

10. A gas turbine engine comprising a main gas path extending in serial flow across a compressor, a combustor, a turbine, and an exhaust section, the exhaust section having an outer shroud forming a radially outer limit to the main gas path, an inner shroud forming a radially inner limit to the main gas path, and a plurality of struts each having a length extending across the main gas path from a radially inner end to a radially outer end, the struts circumferentially interspaced from one another, the struts each having a leading edge facing the turbine and an oppositely oriented trailing edge, a stiff connection between the radially inner end and the inner shroud, and a point connection between the radially outer end and the outer shroud, the point connection having a projection projecting radially from the radially outer end, the projection being rigidly secured to the radially outer end, the projection being rigidly secured to the outer shroud.

11. The gas turbine engine of claim 10 wherein the struts have an airfoil body having a cross-sectional area, the point connections having a cross-sectional area between 5 and 30% of the cross-sectional area of the airfoil body at the radially outer end of the struts, with a portion of the cross-sectional area of the airfoil body at the radially outer end of the struts in excess of the point connection being free from the outer shroud.

12. The gas turbine engine of claim 11 wherein the point connections have a cross-sectional area between 10 and 20% of the cross-sectional area of the radially outer end of the struts.

13. The gas turbine engine of claim 10 wherein the projection has a cross-sectional periphery welded to the outer shroud and forming the point connection.

14. The gas turbine engine of claim 10 wherein the protection is a threaded stem projecting radially from a portion of a cross-sectional area thereof, the threaded stem extending radially across the outer shroud, secured via a nut, and forming the point connection.

15. The gas turbine engine of claim 10 wherein the struts have an airfoil body having a cross-sectional area, and an entire periphery of the airfoil body at the radially inner end is secured to the inner shroud.

16. The gas turbine engine of claim 15 wherein the entire periphery of the airfoil body at the radially inner end is welded to the inner shroud.

17. The gas turbine engine of claim 10 wherein the strut includes a main body portion and an insert welded to the main body portion, the projection projects radially from the insert from a cross-sectional area of the strut and forming the point connection.

18. The gas turbine engine of claim 10 wherein the strut includes a main body portion and an insert welded to the main body portion, an entire periphery of the insert being welded to the inner case and forming the stiff connection.

19. The gas turbine engine of claim 10 wherein the struts are located upstream of a mixer, and a bypass flow to be mixed with the exhaust flow circulates radially outwardly of the outer shroud.

20. A method of operating a gas turbine engine having a plurality of struts extending radially across an exhaust gas path between an inner shroud and an outer shroud, circumferentially interspaced from one another, the method comprising subjecting the struts to thermal expansion while:
 a) the inner shroud rigidly holds an inner end of the struts;
 b) the outer shroud rigidly holds a point connection provided at the outer end of the struts, the point connection having a projection projecting radially from the outer end, the projection being rigidly secured to the outer end, the projection being rigidly secured to the outer shroud;
 c) a portion of the outer end of the struts in excess of the point connection moving relative to the outer shroud due to said thermal expansion.

* * * * *